Dec. 18, 1934.  C. W. JONES ET AL  1,984,833
PROCESS AND APPARATUS FOR DEHYDRATING SALINE PRODUCTS
Filed April 13, 1932
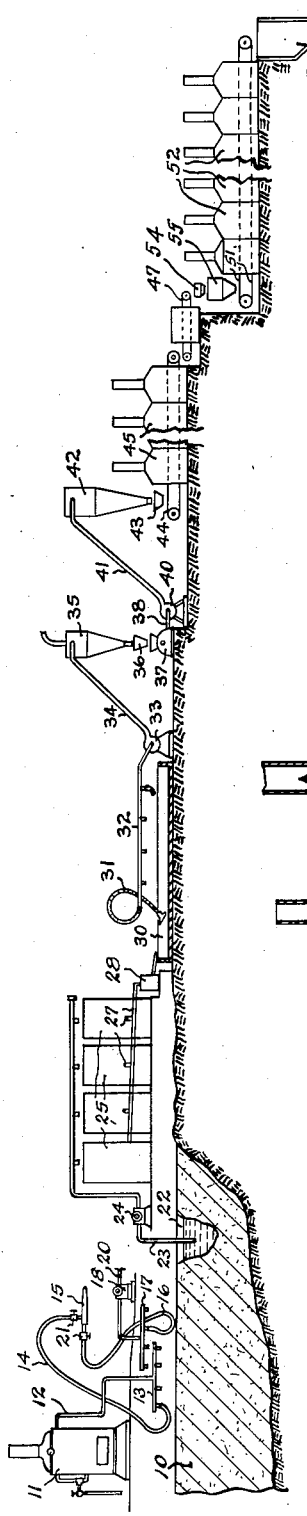
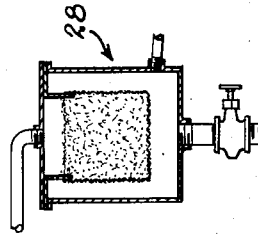
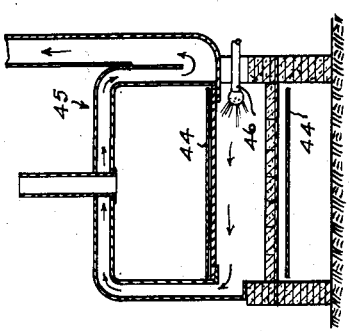
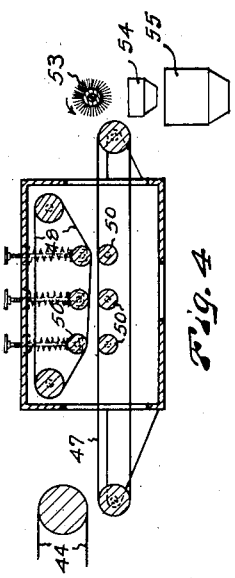
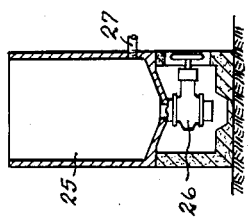
INVENTORS
Clarence W. Jones
BY Thomas Joseph Murray
George F. Andersen
Fred C. Matheny ATTORNEY Patented Dec. 18, 1934

1,984,833

UNITED STATES PATENT OFFICE 1,984,833

PROCESS AND APPARATUS FOR DEHYDRATING SALINE PRODUCTS

Clarence W. Jones, Thomas Joseph Murray, and George F. Andersen, Okanogan, Wash.

Application April 13, 1932, Serial No. 604,914

11 Claims. (Cl. 23—1)

Our invention relates to a process and apparatus for dehydrating saline crystals containing water of crystallization and the general objects of our invention are to devise an inexpensive simple and efficient continuous process and apparatus by which any saline product may be taken from a natural state and completely purified and dehydrated and made ready for the market.

Another object of our invention is to devise a dehydration process and apparatus of this nature by which a very high percentage of recovery of the saline product is obtained.

Another object is to provide a dehydration process and apparatus by which the finished product is left in a granulated or lumpy form thereby making it more suitable for certain commercial uses than it would be if left in a powdered state due to the fact that if powdered saline salts are used in certain process the losses of the salts are heavy.

Another object is to provide a saline product which is not subject to atmospheric conditions and which will not collapse nor easily re-absorb moisture from the air after it has been dehydrated.

In accordance with our invention we take saline crystals in their natural state, usually mixed with dirt and like foreign matter, and dissolve these saline crystals by the application of jets of steam and hot water thereby forming a concentrated brine solution. This concentrated brine solution is then pumped into settling tanks where a temperature above that at which the material crystallizes is maintained and the dirt and sediment and heavier foreign matter is allowed to settle out. The brine is then drawn off and preferably filtered to further purify the same and is then passed into a recrystallization tank where the temperature of the purified brine is lowered and the saline matter is again reduced to a crystal state. The weak brine which has not crystallized is then drawn off and the dehydration of the recrystallized saline matter is commenced. The first step in this dehydration is to dry out the surface moisture. This may be done by picking up the crystals from the recrystallization tank by suction means, blowing these crystals through a tube, and into a cyclone type dust collector, from which they pass downwardly into a hopper. These dried crystals are then ground and the ground product is further dried by blowing it through a relatively long pipe and permitting it to descend through another cyclone type dust collector, this last drying forms a coating of dried and partly dehydrated material on the outside of the crystals. These partly dried crystals are then deposited on an endless moving steel belt and carried through a melting furnace where the parts containing water of crystallization are melted and the water of crystallization taken up by the dried coatings which have been formed on the outside of such crystals. The bulk of this material must be dried enough during the blowing process so that it will thoroughly absorb the remaining moisture or water of crystallization in the heating furnace, leaving it in a damp state. While in this damp state the material is run through squeezing rolls 50 which compress it into a thin compact sheet which is easily broken up into any size particles desired. This cake is then broken up and passed through a dehydration furnace where the remainder of the moisture is evaporated and the material is discharged in the form of a completely dehydrated product of a high degree of purity which is not a powder but is in the form of small lumps or chunks which may be used in commercial processes with much less loss than if it is in powdered form. In the manufacture of paper and in other commercial process where saline salts are used they are melted in furnaces. If they are placed in these furnaces in light powdered form part of the salts pass off in the form of dust and are lost. This loss is overcome by having the salts in the form of lumps or chunks in accordance with this invention. Another advantage attained by our process of dehydration is that the resultant product is highly resistant to the reabsorption of water in contrast to the usual dehydrated powdered salts which reabsorb moisture very readily.

In the drawing Figure 1 is a somewhat diagrammatic view partly in elevation and partly in section of apparatus which is suitable for carrying out our process.

Fig. 2 is a sectional view on a larger scale of a settling tank embodied in the invention.

Fig. 3 is a fragmentary sectional view of a furnace embodied in the invention.

Fig. 4 is a fragmentary sectional view of a continuous feed press embodied in the invention.

Fig. 5 is a sectional view of a sand filter which may be used in carrying out our process.

Our process and apparatus is herein disclosed as applied to the dehydration of sodium sulphate but it will be understood that the same may be equally well applied to the dehydration of sodium carbonate or to any saline salts which are to be dehydrated.

For the purpose of the present disclosure we have assumed that the material to be dehydrated is found in a natural surface deposit where the saline crystals occur in their natural state. In Figure 1, 10 indicates, somewhat diagrammatically, a saline deposit of such nature.

Our dehydration apparatus comprises a steam boiler 11, connected by a pipe 12 with a multiple outlet pipe 13. A hose 14 connects one outlet of the pipe 13 with a steam atomizer nozzle 15. If several atomizer nozzles are to be used they are similarly connected with the other outlets of the pipe 13. The atomizer nozzle 15 is also connected by a hose 16 with a multiple outlet pipe 17 which is connected with a high pressure water pump 18. A fresh water supply pipe 20 is connected with the pump 18 and extends to any suitable source from which fresh water may be obtained. A valve 21 is provided in each hose 14 and 16 whereby the supply of steam and the supply of water to the atomizer nozzle may be regulated independently of each other. The water is atomized and heated and mixed with the steam in the atomizer nozzle 15 and is discharged at a high velocity therefrom. The saline crystal matter in the deposit 10 is dissolved by the application of the jet from one or more of the nozzles 15 thus forming a concentrated brine which collects in a sump 22 formed in the bed of the deposit 10.

From the sump 22 the brine is drawn through a pipe 23 to a pump 24 and thence pumped into settling tanks 25 where sand, dirt and other foreign matter is allowed to settle, it being understood that the saline matter is in solution and will not precipitate in these tanks. The accumulation of foreign matter may be removed from the bottoms of these settling tanks by opening valves 26 in the bottoms of these tanks, Fig. 2, and flushing the tanks out. The temperature of the brine in the settling tanks is preferably kept substantially constant and is not below ninety degrees Fahrenheit. We find that a period of one hour in the settling tanks is long enough for all heavier foreign matter to settle out. The brine is then drawn off through pipes 27 and passes through one or more sand traps 28 where it is filtered through clean sand and further purified. We find that the sand traps remove substantially all sediment and solid matter which is not removed by the settling process without the loss of any of the saline matter.

The brine then passes into a large shallow recrystallization tank 30 where the temperature is lowered below the crystallization point and the saline matter is allowed to crystallize in the bottom of this tank. We find that a temperature of forty degrees above zero Fahrenheit is low enough to produce rapid crystallization of sodium sulphate and that the brine should be allowed to stand for eight hours or more to obtain a recrystallization of the greater proportion of the saline matter. After this recrystallization has taken place, the water is removed from the recrystallization tank and preferably returned to the deposit 10, it having been found that this water still contains some saline matter. The recrystallized saline matter left in the recrystallization tank is then picked up by one or more suction hose 31 and drawn through a multiple outlet pipe 32 to a blower fan 33 from which it is blown through an upwardly inclined pipe 34 and discharged into a cyclone type dust collector 35, through which it passes downwardly and falls into a hopper 36 from which it is discharged into a grinder 37. During the travel through the hose 31, pipe 32, blower fan 33, pipe 34, and dust collector 35 the moisture which is picked up along with the saline crystals is evaporated so that the crystals are substantially dry except for the water of crystallization at the time they are delivered to the grinder 37.

From the grinder 37 the ground crystals are drawn through a pipe 38 to a blower fan 40 and are thence blown through a long pipe 41 and delivered tangentially into another cyclone type dust collector 42 through which they pass downwardly and are discharged into a hopper 43 and then delivered onto an endless moving steel belt 44. During the travel of the ground crystals from the grinder 37 to the hopper 43 the surfaces of the ground particles are thoroughly dried and a white coating of dry saline matter is formed on the exterior of each particle. This coating preferably equals about one half of the volume of the original particle. When the ground crystals are delivered onto the belt 44 they will not tend to stick to said belt. The formation of the relatively dry coating on the ground crystals at this stage of the process has an important bearing on the finished product and on the complete dehydration of the saline matter. If this coating of dry material is not formed on the crystals at this tage, the material which comes in contact with the belt 44 will stick to it and some of the material will liquefy and run off of the belt. The material which is deposited on the moving metal belt 44 passes at once into a relatively long melting furnace 45 where it is subjected to a temperature just high enough to melt the entire mass, the crystals giving up some of their water of crystallization and the dried coatings on the outside absorbing this water. The furnace 45 is heated by burners 46 placed directly beneath the top flight of the belt 44.

From the belt 44 the material discharges onto a porous belt 47 and passes under another porous belt 48, Fig. 4, and between pairs of rolls 50. The pairs of rolls 50 compress the product into a thin firm sheet. This sheet is broken up into suitable size pieces as it discharges from the belt 47 and the broken up product is deposited on another endless moving metal belt 51 preparatory to entering the final dehydration furnace 52. The means for breaking up the sheet of material as it discharges from the belt 47 may be in the nature of a revolving brush 53 positioned adjacent the end of said belt and arranged to brush the material down into a hopper 54 from which it descends into a revolving sizing screen 55 and is then deposited on the belt 51. If desired either the rotating brush or the sizing screen may be dispensed with as we have found that either the revolving brush or the sizing screen taken alone is sufficient to break up the mass. The sizing screen, if used, insures a more uniformly sized product.

In the dehydrating furnace the broken up pieces of material are subjected to a relatively high heat for a period of several minutes and all the water is evaporated leaving a relatively pure thoroughly dehydrated product which may discharge into a hopper 56.

If the material is partially but not entirely dried before entering the melting furnace 45, as by causing the deposit of white powder, hereinbefore described, to be formed on the exterior thereof as said material travels through the pipe 41 and cyclone dust collector 42 we find that a final product which is much more resistant to reabsorption of moisture is obtained. By passing the product between the rolls 50 as it discharges from the melting furnace we accomplish two desirable functions, namely the cheap and easy elimination of any excess water which would otherwise have to be evaporated at a higher cost, and the compression of this material into a flat sheet so that it may be broken up into particles of the desired size before passing into the dehydrating furnace.

If the material is completely dried out before it enters the melting furnace it will become a fine white powder which will re-absorb moisture very easily.

The foregoing description and accompanying drawing clearly disclose a preferred embodiment of our invention but it will be understood that this disclosure is merely illustrative and that such changes in the invention may be made as are fairly within the scope and spirit of the following claims.

We claim:

1. In a method of dehydrating saline crystals, the steps of partially air drying said saline crystals, melting the partially air dried saline crystals, pressing the melted mass and then dehydrating the same by the application of heat.

2. The method of dehydrating saline crystals which consists in grinding said crystals, partially air drying said ground crystals to a point where a dry powder is formed on the outside thereof, melting the partially air dried ground crystals to free the water of crystallization which is absorbed by the dry powder on said crystals, pressing out said water and dehydrating the saline matter.

3. The method of dehydrating saline crystals to produce a dehydrated saline product in lump form which consists in grinding said crystals, partially air drying said ground crystals, melting the partially air dried product to free the water of crystallization, pressing out said water and forming a thin cake of the solid saline matter, breaking up said cake and dehydrating said broken up cake.

4. The method of reclaiming saline matter from natural deposits, which consists in dissolving the crystallized saline matter with hot water, settling and filtering the brine so produced, recrystallizing the saline matter from the purified brine, partially air drying said recrystallized matter to a point where a dry powder is formed on the outside thereof, melting said partially air dried matter, pressing said melted matter into a thin sheet and then dehydrating the same by the application of heat.

5. The method of reclaiming saline matter from natural deposits, which consists in dissolving the crystallized saline matter with hot water, settling and filtering the brine so produced, recrystallizing the saline matter from the purified brine, grinding the recrystallized saline matter, partially air drying said ground matter, melting said partially air dried matter pressing said melted matter into a thin cake, breaking the cake into pieces and dehydrating said broken cake.

6. The method of reclaiming saline matter from a natural deposit, which consists in dissolving the crystallized saline matter with a hot water spray, settling and filtering the brine so produced, recrystallizing the saline matter from the purified brine, surface drying the recrystallized saline matter, grinding said surface dried matter, partially air drying said ground matter to form a dried coating on the exterior of the particles, melting the partially air dried matter to form a mass, compressing said mass into a thin cake, breaking up said cake, and dehydrating said broken up cake.

7. The method of purifying and dehydrating saline crystals, which consists in dissolving the crystals from a natural deposit by a spray of hot water and steam thereby forming a concentrated brine, allowing said brine to settle to remove foreign matter, drawing off the settled brine through sand filter means, recrystallizing the saline matter by reducing the temperature of the brine, removing the surface moisture from the recrystallized saline matter, grinding said recrystallized saline matter, drying said ground recrystallized matter to form a coating of dry matter on the exterior of the particles, melting said mass of partially dried matter, pressing said melted mass to extract moisture and form a thin cake of the same, breaking up said cake into small pieces and dehydrating said broken up cake by the use of heat.

8. In dehydration apparatus for saline products, a melting furnace, a dehydration furnace, and a press operatively connected with said two furnaces for receiving material from the melting furnace and delivering the material to the dehydration furnace, whereby water is pressed out of saline material which is passing from said melting furnace to said dehydration furnace and the saline matter is pressed into a compact cake.

9. In dehydration apparatus for saline products, a grinder, an air drier connected with said grinder to receive material from said grinder, a melting furnace connected with said air drier to receive material from said air drier, a press connected with said melting furnace to receive material from said melting furnace, and a dehydration furnace connected with said press to receive material from said press.

10. Apparatus for reclaiming saline matter from natural deposits, comprising means for directing a jet of hot water and steam onto a saline deposit to form brine, settling tanks, means for elevating said brine into said settling tanks, filter means through which the brine may pass after settling, a recrystallization tank connected with the filter means, combined vacuum and drier means for picking up and drying the recrystallized matter, a grinder connected with said pick up and drier means, other drier means connected with said grinder, a melting furnace connected with said other drier means to receive the dried ground material, a press connected with said melting furnace to receive the material from said melting furnace and a dehydration furnace connected with said press.

11. Apparatus for reclaiming saline matter from natural deposits, comprising a steam boiler, water supply means, jet forming means connected with said boiler and said water supply means and arranged to direct a jet of hot water and steam onto a saline deposit to form brine, settling tanks, means for elevating said brine into said settling tanks, filter means through which the brine may pass after settling, a recrystallization tank connected with the filter means, combined vacuum and drier means for picking up and drying the recrystallized matter, a grinder connected with said pick up and drier means, other drier means connected with said grinder, a melting furnace connected with said other drier means to receive the dried ground material, press means connected with said melting furnace to receive the material from said melting furnace, and a dehydrating furnace connected with said press means to receive the material from said press means.

CLARENCE W. JONES.
THOMAS JOSEPH MURRAY.
GEORGE F. ANDERSEN.